(12) United States Patent
Antoniacomi

(10) Patent No.: US 7,775,658 B2
(45) Date of Patent: Aug. 17, 2010

(54) FRAME FOR SPECTACLES

(75) Inventor: Renato Antoniacomi, Forni di Sopra (IT)

(73) Assignee: Target SRL, Forni di Sotto (IT)

( * ) Notice: Subject to any disclaimer, the term of this patent is extended or adjusted under 35 U.S.C. 154(b) by 37 days.

(21) Appl. No.: 12/373,201

(22) PCT Filed: Jul. 6, 2007

(86) PCT No.: PCT/EP2007/056876

§ 371 (c)(1),
(2), (4) Date: Jan. 9, 2009

(87) PCT Pub. No.: WO2008/006778

PCT Pub. Date: Jan. 17, 2008

(65) Prior Publication Data

US 2009/0251658 A1 Oct. 8, 2009

(30) Foreign Application Priority Data

Jul. 10, 2007 (IT) .......................... UD2006A0172

(51) Int. Cl.
*G02C 5/16* (2006.01)
(52) U.S. Cl. .......................... 351/113; 351/153; 16/228
(58) Field of Classification Search ................. 351/113, 351/153, 114, 111, 41, 158; 16/228
See application file for complete search history.

(56) References Cited

U.S. PATENT DOCUMENTS 5,953,791 A * 9/1999 Da Forno ..................... 16/228
6,231,181 B1 5/2001 Swab
6,353,965 B1 * 3/2002 Lo ............................... 16/228
7,232,216 B2 * 6/2007 Kacavenda .................. 351/153
2005/0225716 A1 10/2005 Kacavenda
2006/0209251 A1 9/2006 Kacavenda

FOREIGN PATENT DOCUMENTS

| FR | 1511263 A | 4/1968 |
|---|---|---|
| FR | 2398322 A1 | 2/1979 |
| FR | 2485212 A3 | 12/1981 |
| FR | 2521310 A3 | 8/1983 |
| WO | 96/37801 A1 | 11/1996 |
| WO | 2005/008317 A1 | 1/2005 |

* cited by examiner

*Primary Examiner*—Hung X Dang
(74) *Attorney, Agent, or Firm*—Novak, Druce + Quigg LLP

(57) ABSTRACT

Spectacles frame including a front component supporting a pair of lenses, two supporting temples each hinged by respective hinging elements to the front component, and cushioning and recall members associated with the hinging elements. Cushioning members include: elastic elements in an open seating, inside the respective temple bulk, configured so part of the elastic elements faces outside in the open seating, towards the front component; and a cursor element as an extension and completely inside the bulk of the respective temple, to slide longitudinally along it at the moment of opening-closing of the respective temple relative to the front component, and having a second surface, or external surface, contacting the front component, and a first surface, or internal surface, opposite the second surface, on which the part of the elastic elements facing outside in open seating acts, to keep the cursor element normally thrusting against the front component.

14 Claims, 1 Drawing Sheet

FRAME FOR SPECTACLES

This application is a §371 National Stage Application of International Application No. PCT/EP2007/056876, filed on 6 Jul. 2007, claiming the priority of Italian Patent Application No. UD2006A000172 filed on 10 Jul. 2006.

FIELD OF THE INVENTION

The present invention concerns a frame for spectacles of the type with temples at least partly inclinable elastically towards the outside, beyond the normal position of use, with respect to a front supporting component for the lenses, so as to facilitate the operations to put on and take off the spectacles for the user.

A frame for spectacles having the features of the preamble of the main claim is disclosed in WO-A-96/37801 and in FR-A-2.485.212.0

BACKGROUND OF THE INVENTION

Frames for spectacles are known, substantially consisting of two temples or side-pieces, hinged on opposite sides to a lateral part, in Italian also called the "snout", of a front supporting component for the lenses, so as to be able to be rotated from a closed position substantially parallel to the "snout", to an open position substantially perpendicular to the "snout".

Frames for spectacles are also known, in which the temples are hinged to the front component in such a manner as to allow, apart from a rotation from the closed position to the open position, a partial inclination of the temples towards the outside with respect to the normal position of use, in order to facilitate the user in putting on and taking off the spectacles.

This type of frame is normally provided with elastic return means, provided for example with springs, rubber blocks, steel elements with a memory or others, defining an elastic hinge-type connection between the temples and the front component, so as to allow the temples to return automatically to their open position.

The elastic means normally used, however, is disposed in such a manner that it exerts torsion stresses on the mechanical components of the hinges, which cause an increase in wear of the components and, with time, deformations and/or breakages thereof.

In order to limit such deformations and breakages, it is known to make the hinges with materials highly resistant to said torsion stresses, or to design hinges with particular solutions, normally consisting of a large number of components, such as springs, sliders, cams or other, which guarantee a longer duration of the hinge.

However, these solutions are particularly expensive and not always compatible with the design and lightness of the frame.

Moreover, in most of the known hinge/return means systems, there are in any case screws present, or other attachment elements, of very limited size which require specific tools and extremely precise assembly operations.

Elastic hinges are also known, provided with a cursor element able to slide with respect to the temple due to the effect of the thrust of the spring, and protruding outside the temple in order to define the limit positions of opening and closing of the temple with respect to the front component.

The parts of the cursor that protrude outside the lateral bulk of the temple are limitative, however, in terms of the possible aesthetic conformations of the temple, and are a complication with regard to the making of the cursor itself, both in terms of production and also in terms of functionality, also considering the size and tolerances required.

Furthermore, the solution with the cursor protruding outside the temple entails a thickening of the male/female pivots of the hinge in order to guarantee adequate abutment surfaces of the protruding portion and the correct pivoting of the parts, with a consequent increase in production costs, and also the possibility of knocking against the temples of the user when the spectacles are worn.

One purpose of the present invention is therefore to achieve a frame for spectacles of the type with temples at least partly inclinable elastically towards the outside beyond the normal position of use, where the hinges have a prolonged resistance over time, limiting the risk of deformation and breakages of the mechanical components and without needing to use materials that are highly resistant to torsion or stresses or particular design solutions.

Another purpose of the present invention is to achieve a frame for spectacles which solves said disadvantages of the state of the art, simply and economically, using components that are easy to assemble and that need little or no maintenance and are not subject to wear.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a frame for spectacles according to the present invention comprises a front component, or "snout", which supports a pair of lenses, two supporting temples each hinged by means of respective hinging means to the front component, and elastic cushioning and recall means associated with the hinging means, which allow an inclination of the temples towards the outside, beyond the normal positions of use, with automatic return to the open position of the temple with respect to the front component.

The cushioning and recall means comprises elastic means disposed in an open seating made inside the bulk of the respective temple and configured so that a part of said elastic means faces towards the outside in said open seating, in the direction of said "snout".

The cushioning and recall means also comprises a cursor element disposed completely inside the bulk and as an extension of the relative temple.

The cursor element is able to slide longitudinally along the temple at the moment the latter is opened or closed with respect to the front part. The cursor element comprises a second surface, or external surface going from the "snout" towards the temple, disposed in contact with the front component, and a first surface, or internal surface going from the "snout" towards the temple, on which the part of the elastic means facing towards the outside in the open seating acts, in order to maintain the cursor element normally thrusting against the front component.

In this way, in the event of a partial rotation of the temple towards the outside, beyond the normal position of use, the cursor element slides longitudinally, completely comprised inside the bulk of the temple, compressing the elastic means which, when the stress imparted to the temple is terminated, causes the automatic return of the temple to its open position of use, that is, a condition in which the second surface of the cursor element is completely in contact with the front component.

With the present invention, the thrust exerted by the elastic means on the cursor element is such as not to compromise the correct and long-lasting functioning of the hinging means, since this thrust has a single direction always substantially longitudinal, and takes place completely inside the bulk of the temple, and hence it does not generate significant moments of torsion on the components of the hinging means.

This advantage allows to use simplified hinging means made with materials having a limited cost.

Moreover, the position of the cursor element, completely comprised inside the bulk of the temple, prevents any type of protrusion of the latter to the outside, thus improving the simplicity of production of the parts, the longitudinal nature of the shapes and the good possibility of aesthetically personalizing the frame thus made.

According to a preferential form of embodiment, the elastic means consists of two springs disposed symmetrically astride the longitudinal median plane of the temple, and with a segment protruding into said open seating, to cooperate with said first surface of the cursor. In this way, the effort to which the springs are subjected is shared in a balanced way, further reducing the tensions and stresses to which the elastic means is subjected.

According to a preferential form of embodiment, the hinging means is defined by a simple, male/female coupling of shape between the temple and the front component and by a single pin disposed through between the two. In this embodiment, considering the normal stresses to which they are subjected, the components of the hinging means are made for example of plastic, wood, common steels or other material of limited cost.

This solution thus allows to considerably reduce both the number of components and the overall costs of producing the frame for spectacles.

In another form of embodiment of the present invention, the distance between the axis of rotation of the pin of the hinging means and the segment of the front component that contacts the cursor element in the condition when the temple is rotated towards the outside, beyond the position of use, is greater than the possible travel of the cursor element along the temple.

This geometric positioning condition of the pin prevents the cursor element from overlapping said segment of the front component, thus causing the temple to stop rotating after some degrees with respect to the position of use.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
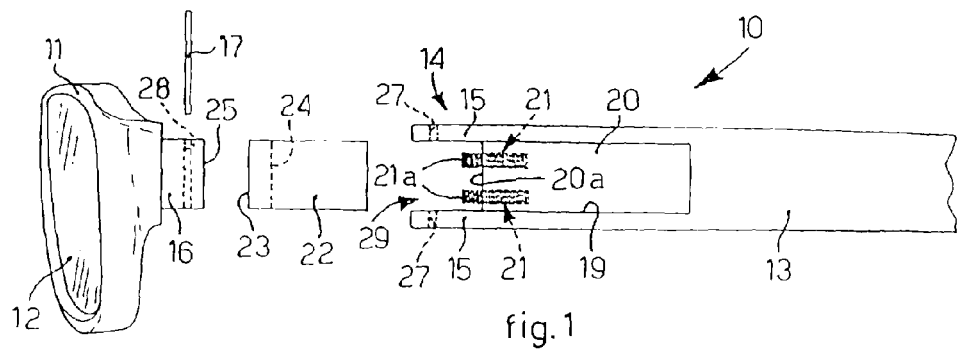
FIG. 1 is an exploded, lateral and part view of a frame for spectacles according to the present invention.

With reference to the attached figures, a frame for spectacles 10 according to the present invention comprises a front component 11 that supports two lenses 12, for example sun lenses, sight lenses, protective lenses or suchlike, and two supporting temples 13, or side-pieces, of which only one is visible in the figures. Both the temples 13 and the front component 11 can be made of plastic material, wood or other suitable material.

The temples 13 are hinged on opposite sides, by means of respective fork-shaped ends 14, to the lateral part of the front component 11, in Italian also called the "snout".

The fork-shaped end 14 is defined by two fins 15, substantially parallel and of the same length, and by an empty space 29 between them (FIG. 1), said space 29 being open towards the "snout" 11.

The fins 15 of the fork-shaped end 14 are coupled with play to a mating hinging block 16 provided on the front component 11. A metal pin 17 is disposed through respective holes 27 and 28 made in the two fins 15 and on the block 16, to determine the hinging of the temples 13 and the front component 11.

On the two lateral flanks of said fork-shaped end 14, in a position substantially comprised between the two hinging fins 15, and in an internal position with respect to the empty space 29, two sliding seatings 19 are also made longitudinally.

The two sliding seatings 19 define between them a central wall 20, of a lesser thickness than the temple 13, between the two hinging fins 15.

In the central wall 20 two helical springs 21 are also housed, disposed in a direction substantially longitudinal to the temple 13, astride the longitudinal median plane of the temple 13, and having an end segment 21a that protrudes into the empty space 29 from a front surface 20a of the central wall 20, in any case in an area comprised inside the bulk of the respective temple 13.

The frame 10 also comprises a cursor element 22 made for example of plastic material and substantially C-shaped, which is disposed astride the central wall 20, so as to be partly housed in the sliding seatings 19, and in any case completely comprised inside the lateral bulk of the temple 13.

The cursor element 22 comprises at least a first thrust surface 24, internal, with reference to the relative temple 13, on which the external segment 21a of the helical springs 21, facing into the empty space 29, acts.

In this way, the cursor element 22 can slide longitudinally to the temple 13, in a guided manner and with a slight play, inside the sliding seatings 19, for a determinate travel "T", defined by the maximum compression of the helical springs 21.

Figure 2:
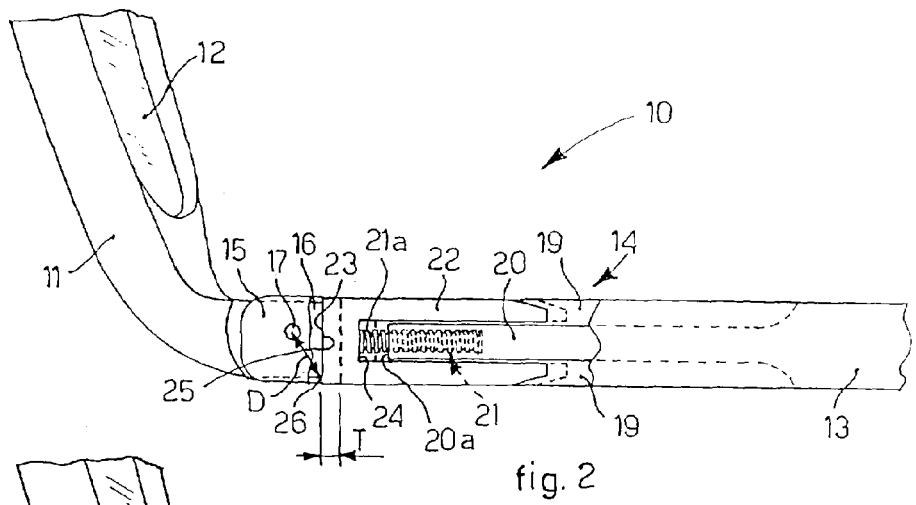
FIG. 2 is a view from above of an assembled detail of the frame in FIG. 1 in a first operating condition.

The cursor element 22 also comprises a second head surface 23, opposite the thrust surface 24, which due to the effect of the thrust exerted by the helical springs 21 (FIG. 2) on the first thrust surface 24, contacts with a slight pressure a corresponding abutment surface 25 of the hinging block 16, maintaining the temple 13 stably in the open position of use of the frame 10.

On the contrary, by rotating the temple 13 towards the outside, beyond the position of use, the second head surface 23 of the cursor element 22 slides on an external edge 26 of the abutment surface 25, and the cursor element 22, overcoming the thrust of the helical springs 21, is longitudinally displaced with respect to the temple 13 along the sliding seatings 19 until it reaches a condition of maximum compression of the helical springs 21, that is, its maximum possible travel T.

According to an embodiment of the present invention, the distance "D" between the axis of rotation of the metal pin 17 and the external edge 26 of the hinging block 16 is greater than the travel T of the cursor element 22.

Figure 3:
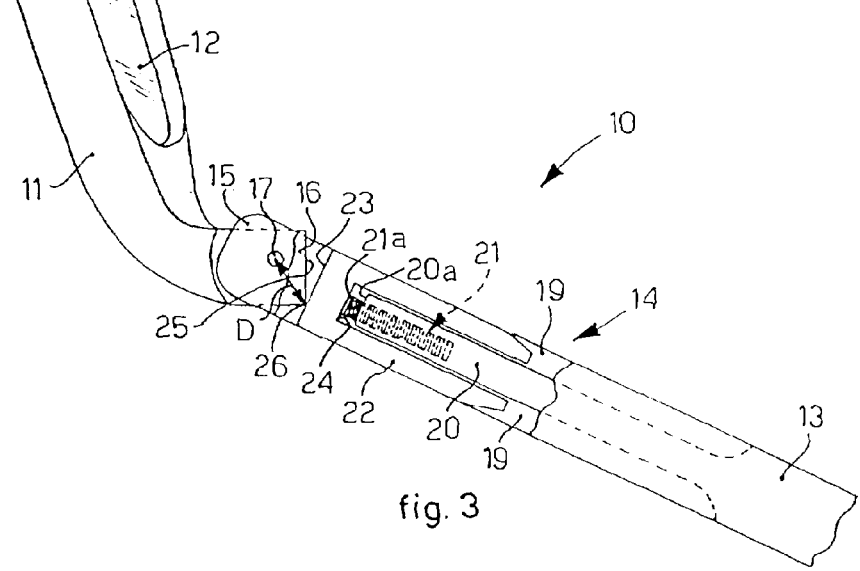
FIG. 3 is a view from above of the detail in FIG. 2 in a second operating condition.

This geometric positioning condition of the metal pin 17 prevents the second head surface 23 from overlapping the external edge 26 of the hinging block 16, thus stopping the rotation of the temple 13 after some degrees (FIG. 3), for example after about 20°, beyond the open position of use.

It is clear, however, that modifications and/or additions of parts may be made to the frame for spectacles 10 as described heretofore, without departing from the scope of the present invention.

For example, it comes within the scope of the present invention to provide that the cursor element 22 is provided, at least on one surface facing towards the outside of the frame 10, with trade marks, logos, writings, or alphanumerical symbols, which identify for example the producer or the distributor of the frame for spectacles 10.

According to another variant, the elastic means comprises only one helical spring 21, to allow a reduction in width of the temple 13.

It is also possible to use leaf springs, cup springs or springs of another type, instead of the helical springs 21 already described.

It also comes within the scope of the present invention to provide that the cursor element is made of a wood material or wood substitute.

It is also clear that, although the present invention has been described with reference to specific examples, a person of skill in the art shall certainly be able to achieve many other equivalent forms of frame for spectacles, having the characteristics as set forth in the claims and hence all coming within the scope of protection defined thereby.

The invention claimed is:

1. A frame for spectacles comprising a front component able to support a pair of lenses two supporting temples each hinged by means of respective hinging means to said front component, and cushioning and recall means associated with said hinging means, wherein said cushioning means comprises:
   elastic means disposed in an open seating made inside the respective temple and configured so that a part of said elastic means is facing towards the outside and protrudes into an empty space of said open seating, in the direction of said front component; and
   a cursor element, substantially C-shaped, disposed as an extension and completely inside the respective temple, so as to slide longitudinally along said temple at the moment of opening-closing of the relative temple with respect to said front component, and comprising at least a second external surface, disposed in contact with said front component, and a first internal surface of the C-shape, opposite said second external surface, on which said part of said elastic means facing towards the outside in said open seating is able to act, to keep said cursor element normally thrusting against said front component.

2. The frame for spectacles as in claim 1, wherein each of said temples comprises a fork-shaped end with two fins defining said empty space between said two fins that forms said open seating and facing towards said front component.

3. The frame as in claim 2, wherein, on said end, two sliding seatings are made longitudinally on opposite sides for said cursor element, said sliding seatings defining between them a central wall with a reduced thickness with respect to the temple.

4. The frame for spectacles as in claim 3, wherein said elastic means is housed in said central wall and partly protrudes into said empty space from a front surface of said central wall, to contact said first internal surface of said cursor element.

5. The frame for spectacles as in claim 3, wherein said cursor element is disposed astride said relative temple, and is able to cooperate with the inside of said sliding seatings to slide longitudinally to the temple, in a guided manner and with a slight play, for a determinate travel (T).

6. The frame for spectacles as in claim 2, wherein said hinging means comprises a hinging block, made on said front component and disposed with play between said fins, and a pin disposed both through said fins and also through said hinging block.

7. The frame for spectacles as in claim 6, wherein said hinging block comprises an abutment surface facing towards the respective temple and on which said second external surface of said cursor element rests.

8. The frame for spectacles as in claim 7, wherein at the moment when said temple opens towards the outside, said second external surface of said cursor element slides on an external edge of said abutment surface of said hinging block.

9. The frame for spectacles as in claim 8, wherein the distance (D) between the axis of rotation of said pin and said external edge of said abutment surface is greater than the travel (T) of said cursor element in said sliding seatings.

10. The frame for spectacles as in claim 1, wherein said elastic means comprises at least a helical spring, for acting in a direction substantially longitudinal to the relative temple.

11. The frame for spectacles as in claim 1, wherein said elastic means comprises two springs disposed symmetrically astride the longitudinal median plane of said temples.

12. The frame for spectacles as in claim 1, wherein both said temples and also said front component and said cursor element are made of plastic material.

13. The frame for spectacles as in claim 1, wherein at least said cursor element is made of wood material or wood substitute materials.

14. The frame for spectacles as in claim 1, wherein on at least said second external surface of said cursor element a graphic or alphanumerical symbol is provided identifying said frame for spectacles.

\* \* \* \* \*